(12) United States Patent
Andersson et al.

(10) Patent No.: US 11,437,074 B2
(45) Date of Patent: Sep. 6, 2022

(54) METHOD AND SYSTEM FOR COMPOSING A VIDEO MATERIAL

(71) Applicant: Axis AB, Lund (SE)

(72) Inventors: Viktor A. Andersson, Lund (SE); Moa Leonhardt, Lund (SE); Joacim Tullberg, Lund (SE); Krister Nässlind, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 17/066,026

(22) Filed: Oct. 8, 2020

(65) Prior Publication Data

US 2021/0125640 A1 Apr. 29, 2021

(30) Foreign Application Priority Data

Oct. 28, 2019 (EP) .................................... 19205631

(51) Int. Cl.
*G11B 27/031* (2006.01)
*H04N 5/232* (2006.01)
(Continued)

(52) U.S. Cl.
CPC ....... *G11B 27/031* (2013.01); *H04N 5/23299* (2018.08); *H04N 5/77* (2013.01); *H04N 7/181* (2013.01)

(58) Field of Classification Search
CPC .... G11B 27/031; H04N 5/23299; H04N 5/77; H04N 5/775; H04N 5/85; H04N 7/181;
(Continued)

(56) References Cited

U.S. PATENT DOCUMENTS

| 7,839,926 B1 | 11/2010 | Metzger et al. |
| 2008/0174485 A1* | 7/2008 | Carani ................... G06Q 10/08 342/357.46 |

(Continued)

FOREIGN PATENT DOCUMENTS

| EP | 2869568 A1 | 5/2015 |
| EP | 2980767 A1 | 2/2016 |
| WO | 2007/118272 A1 | 10/2007 |

OTHER PUBLICATIONS

Extended European Search Report dated Apr. 2, 2020 for the European Patent Application No. 19205631.5.

*Primary Examiner* — Hung Q Dang
*Assistant Examiner* — Nienru Yang
(74) *Attorney, Agent, or Firm* — Volpe Koenig

(57) ABSTRACT

A method and system for composing a video of a course of actions along a track in an area monitored by a plurality of video cameras. A first sequence of user inputs defining the track is received. Each user input in the first sequence is associated with a time stamp and is received as an indication of a position in a map of the area being monitored. For each user input in the first sequence, video recordings from those that have a field-of-view covering the position indicated by the user input are collected. The collected video recordings are recorded in a time period starting at the time stamp associated with the user input and ending at a time stamp associated with a next user input in the first sequence or when an indication to stop the collecting is received. A video material is then composed from the collected video recordings.

15 Claims, 7 Drawing Sheets

(51) Int. Cl.
*H04N 5/77* (2006.01)
*H04N 7/18* (2006.01)

(58) Field of Classification Search
CPC ........ H04N 7/18; H04N 5/232; H04N 9/7921;
H04N 9/8042; H04N 9/8227
USPC ........................................................ 386/283
See application file for complete search history.

(56) References Cited

U.S. PATENT DOCUMENTS

| | | |
|---|---|---|
| 2013/0091432 A1 | 4/2013 | Shet et al. |
| 2016/0034477 A1* | 2/2016 | Mao .................... G06K 9/00758 386/353 |
| 2016/0093336 A1* | 3/2016 | Laska ................ H04N 21/4438 386/241 |
| 2018/0061065 A1 | 3/2018 | Mayuzumi |
| 2019/0007646 A1 | 1/2019 | Saito et al. |

\* cited by examiner

METHOD AND SYSTEM FOR COMPOSING A VIDEO MATERIAL

TECHNICAL FIELD

The present invention relates to the field of video monitoring of an area by a plurality of cameras. In particular, it relates to a method and a system for composing a video material of a course of actions along a track in an area monitored by a plurality of video cameras.

BACKGROUND

Video cameras are commonly used for surveillance purposes. A video surveillance system typically includes a plurality of video cameras which are installed in an area to be monitored and a video management system. Video recorded by the cameras is sent to the video management system for storage and for display to an operator. For example, the operator may via the video management system display video recordings from one or more selected video cameras in order to follow events and incidents taking place in the monitored area. Further, if an incident occurs, a video material that can be used as forensic evidence may be composed from the video recordings stored in the video management system.

However, it becomes a challenge to get an overview of the recorded video from all cameras as the number of cameras in the video surveillance system increases. Video surveillance installations with hundreds of cameras are not uncommon. For example, it becomes difficult for the operator to follow a particular course of actions in the scene, such as when a person or a moving object moves in the monitored area. Further, it becomes a tedious job requiring a lot of manual input to set together a video material of a specific incident that has happened in the monitored area.

There is therefore a need for methods and systems that make it easier to set together a video material of a course of actions in a monitored area.

SUMMARY

In view of the above, mitigating the above problems and simplifying the process of composing a video material of a course of actions in an area monitored by a plurality of video cameras would be beneficial.

According to a first aspect, there is provided a method for composing a video material of a course of actions along a track in an area monitored by a plurality of video cameras, comprising:

receiving a first sequence of user inputs defining a track in the area monitored by the plurality of video cameras, wherein each user input in the first sequence is associated with a time stamp and is received as an indication of a position in a map of the area being monitored by the plurality of video cameras, for each user input in the first sequence, collecting video recordings from those of the plurality of video cameras that have a field-of-view covering the position indicated by the user input, the collected video recordings being recorded in a time period starting at the time stamp associated with the user input and ending at a time stamp associated with a next user input in the first sequence or when an indication to stop the collecting is received, and composing a video material from the video recordings collected for each user input in the first sequence.

The first sequence of user inputs is typically received and processed sequentially. Thus, when a user input is received, video recordings for that user input may be collected. Then a next user input is received, whereupon video recordings for that next user input is collected. This may then be repeated until all user inputs in the first sequence have been received and processed.

With this approach, a video material is automatically composed from a track which is defined via user input. Accordingly, the user does not have to go through all the video material recorded by the plurality of cameras to identify video recordings relating to an incident of interest. Instead, the user simply has to define a track in the monitored area and relevant video recordings that depict the course of actions along the track are collected and included in the video material.

The method further allows a user to freely choose the desired track in the monitored area. This is advantageous over approaches where relevant video recordings simply are identified by analysing the video contents of the recordings.

By a video material is meant a collection of video files. The video material may be in the form of an export file in which a plurality of video files are included.

At least one of the user inputs may further indicate a region around the position in the map of the area being monitored, the size of the region reflecting a degree of uncertainty of the indicated position. When collecting video recordings for that at least one user input, video recordings are then collected from those of the plurality of video cameras that have a field-of-view overlapping the region around the position indicated by the user input. The degree of uncertainty may be also be thought of as a precision of the user input. In that case, a smaller size of the region reflects a higher precision and vice versa.

In this way, a user may indicate a region around one or more of the user inputs and video from those cameras having a field-of-view overlapping with the region is collected. Since potentially more cameras will have a field-of-view overlapping a larger region compared to a smaller region, a larger region typically results in more video recordings being collected. This may advantageously be used when a user is uncertain regarding where to position the next user input. By way of example, the user may try to track an object in the monitored area and is unsure whether the object will turn to a position to the right or a position to the left. The user may then indicate a position between the left and the right position and further indicate a region which is large enough to cover both the left and the right position. By way of another example, the user may try to follow a group of objects through the monitored area. The user may then indicate a region around the indicated position such that all objects in the group falls within the region.

One or more of the plurality of cameras may have a variable field-of-view. For example, there may be one or more pan, tilt, zoom cameras. In response to receiving a user input in the first sequence of user inputs, the method may further direct one or more of the plurality of video cameras towards the position indicated in the map of the area being monitored. In that way, cameras which are pointing in another direction may be re-directed towards the indicated position such that they capture video of the occurrences at the indicated position.

In response to receiving a user input in the first sequence of user inputs, the method may further display video recordings from those of the plurality of video cameras that have a field-of-view covering the position indicated by the user input, the video recordings starting from the time stamp associated with the user input. This allows a user to watch the video recordings that are collected for a current user input. The user may use the displayed video recordings as a guidance for the next user input. For example, the user may see in the video recordings that an object is turning in a certain direction in the monitored area. In response, the user may position the next user input in that direction on the map of the monitored area.

The method may further give guidance regarding the next user input via the map of the monitored area. Specifically, in response to receiving a user input in the first sequence of user inputs, the method may display one or more suggestions for a position of a next user input in the map of the area being monitored. This guidance saves time and simplifies the decisions for a user. It may also be advantageous in cases where there are dead zones in the monitored area that are not covered by any of the cameras. If an object enters a dead zone it cannot be deduced from video data where it will appear after having passed through the dead zone. In that case, the suggested positions may indicate to the user where the object typically would appear again after having passed through the dead zone. For example, if a currently indicated position on the map is at the outset of an unmonitored hallway which leads in several directions, the suggested positions may indicate to the user at which monitored positions an object typically appears after having passed through the hallway.

The one or more suggestions for a position of a next user input may be determined on basis of the position indicated by the latest received user input in the first sequence of user inputs and the positions of the plurality of video cameras in the area being monitored. Alternatively, or additionally, the suggestions may be based on statistics regarding common tracks in the monitored area. Such statistics may be collected from historical data. The statistics may be used to calculate one or more most probable next positions given a current position along a track. The one or more most probable next positions may then be presented as suggestions to the user in the map of the monitored area. In this way prior knowledge of the positions of the plurality of the video cameras and/or prior knowledge of typical tracks may be used to guide a user in making a decision for the next user input.

A track which has been input by a user may be stored for later use. Specifically, the method may further comprise: storing the first sequence of user inputs, and accessing the stored first sequence of user inputs at a later point in time to perform the steps of collecting video recordings and composing the video material. In this way, a user may return to a stored track and use it to compose a video material later on, for example when a forensic video material needs to be produced and exported. It may also happen that additional video recordings, which were recorded but not available when the track was input by a user, is made available at a later point in time. For example, video recordings from portable cameras carried by objects in the monitored area may not be available until after the cameras have uploaded their video. In such cases, the stored track may be accessed when the additional video recordings are available to compose a video material which also includes some of the additional video recordings.

Another advantage of working with stored tracks is that the tracks may be modified prior to composing the video material. In more detail, the method may comprise modifying a user input in the stored first sequence of user inputs prior to performing the steps of collecting video recordings and composing the video material. In this way, a user can make adjustments to the stored tracks such that the resulting composed video material better reflects the course of actions in the monitored area.

For example, a user input in the stored first sequence of user inputs may be modified by adjusting the position indicated by the user input in the map of the area being monitored. Modifications may also include adding or removing one or more user inputs to the first sequence, and/or modifying the time stamps associated with one or more of the user inputs. It is also possible to off-set all time stamps of the user inputs in the first sequence by some value. The latter may advantageously be used to compose a video material which reflects the course of actions along a track at an earlier or a later point in time than indicated by the time stamps, such as the course of actions along a stored track 24 hours before or 24 hours after the time stamps associated with the track.

The tracks may be defined via user input in real time, that is while the video recordings are being recorded. In such cases, the time stamp associated with a user input corresponds to a point in time when the user input was made.

Alternatively, the tracks may be defined via user input after the video was recorded. More specifically, the method may comprise receiving and storing video recordings recorded by the plurality of video cameras during a first time period, wherein the step of receiving a first sequence of user inputs is performed after said first time period, and wherein each user input is associated with a time stamp corresponding to a time within said first time period. Accordingly, in this case the time stamps of the user inputs do not correspond to the time points when the user inputs were made. Instead, the time stamp associated with a user input may be generated by off-setting the time point when the user input was made by some user-specified value. For example, the user may specify an appropriate time stamp in the first time period of a first user input in a track and the time stamp of the further user inputs in the track may be set in relation to that first time stamp.

In addition to the plurality of video cameras, other data types of data sources may be arranged in the monitored area. This may include sensors and/or detectors, such as microphones, radar sensors, door sensors, temperature sensors, thermal cameras, face detectors, license plate detectors etc. The method may further comprise: for each user input in the first sequence, collecting data from other data sources that are arranged within a predetermined distance from the position indicated by the user input, the collected data from the other data sources being generated in a time period starting at the time stamp associated with the user input and ending at a time stamp associated with a next user input in the first sequence or when an indication to stop the collecting is received, and adding the data from the other data sources to the video material. In this way, the composed video material does not only include video recordings but also data from other types of sensors and detectors that may provide forensic evidence regarding the course of actions along the track in the monitored area.

Sometimes two tracks in the monitored area may be overlapping. For example, two objects of interest may first follow a common track and then they separate such that two branches of the track are formed. Conversely, two objects may first follow two separate tracks but then join each other along a common track. In such cases, it may be of interest to compose a single video material which includes video recordings of both tracks. For that purpose, the method may further comprise:

receiving a second sequence of user inputs defining a second track in the area monitored by the plurality of video cameras, wherein the first and the second sequence of user inputs are overlapping in that they share at least one user input, for each user input in the second sequence that is not shared with the first sequence of user inputs, collecting video recordings from those of the plurality of video cameras that have a field-of-view covering a position indicated by the user input, the collected video recordings being recorded in a time period starting at a time stamp associated with the user input and ending at a time stamp associated with a next user input in the second sequence or when an indication to stop the collecting is received, and including in the video material the video recordings collected for each user input in the second sequence of user inputs that is not shared with the first sequence of user inputs.

As an alternative, a first and a second sequence of user inputs could be considered to be overlapping if there is a user input in the first sequence and a user input in the second sequence the positions of which are covered by the field-of-views of the same cameras during an overlapping period of time. In that case it may be enough to collect video recordings for the second sequence for user inputs and time-periods when there is no overlap with the first sequence.

According to a second aspect, there is provided a system for composing a video material of a course of actions along a track in an area monitored by a plurality of video cameras, comprising:

a user interface arranged to receive a first sequence of user inputs defining a track in the area monitored by the plurality of video cameras, wherein the user interface is arranged to receive each user input in the first sequence as an indication of a position in a map of the area being monitored by the plurality of cameras and to associate each user input with a time stamp, a data storage arranged to store video recordings from the plurality of video cameras, and a processor arranged to:

receive the first sequence of user inputs from the user interface, for each user input in the first sequence, collect from the data storage video recordings from those of the plurality of video cameras that have a field-of-view covering the position indicated by the user input, the collected video recordings being recorded in a time period starting at the time stamp associated with the user input and ending at a time stamp associated with a next user input in the first sequence or when an indication to stop the collecting is received, and compose a video material from the video recordings collected for each user input in the first sequence.

According to a third aspect, there is provided a computer program product comprising a non-transitory computer-readable medium on which there are stored computer code instructions that, when executed by a processor, causes the processor to execute the method according to the first aspect.

The second and third aspects may generally have the same features and advantages as the first aspect. It is further noted that all possible combinations of features are possible unless explicitly stated otherwise.

BRIEF DESCRIPTION OF THE DRAWINGS

The above, as well as additional features and advantages of the present teachings will be better understood through the following illustrative and non-limiting detailed description of embodiments, with reference to the appended drawings, where the same reference numerals will be used for similar elements, wherein.

DETAILED DESCRIPTION OF EMBODIMENTS

The present teachings will now be set forth fully hereinafter with reference to the accompanying drawings, in which embodiments are shown.

Figure 1:
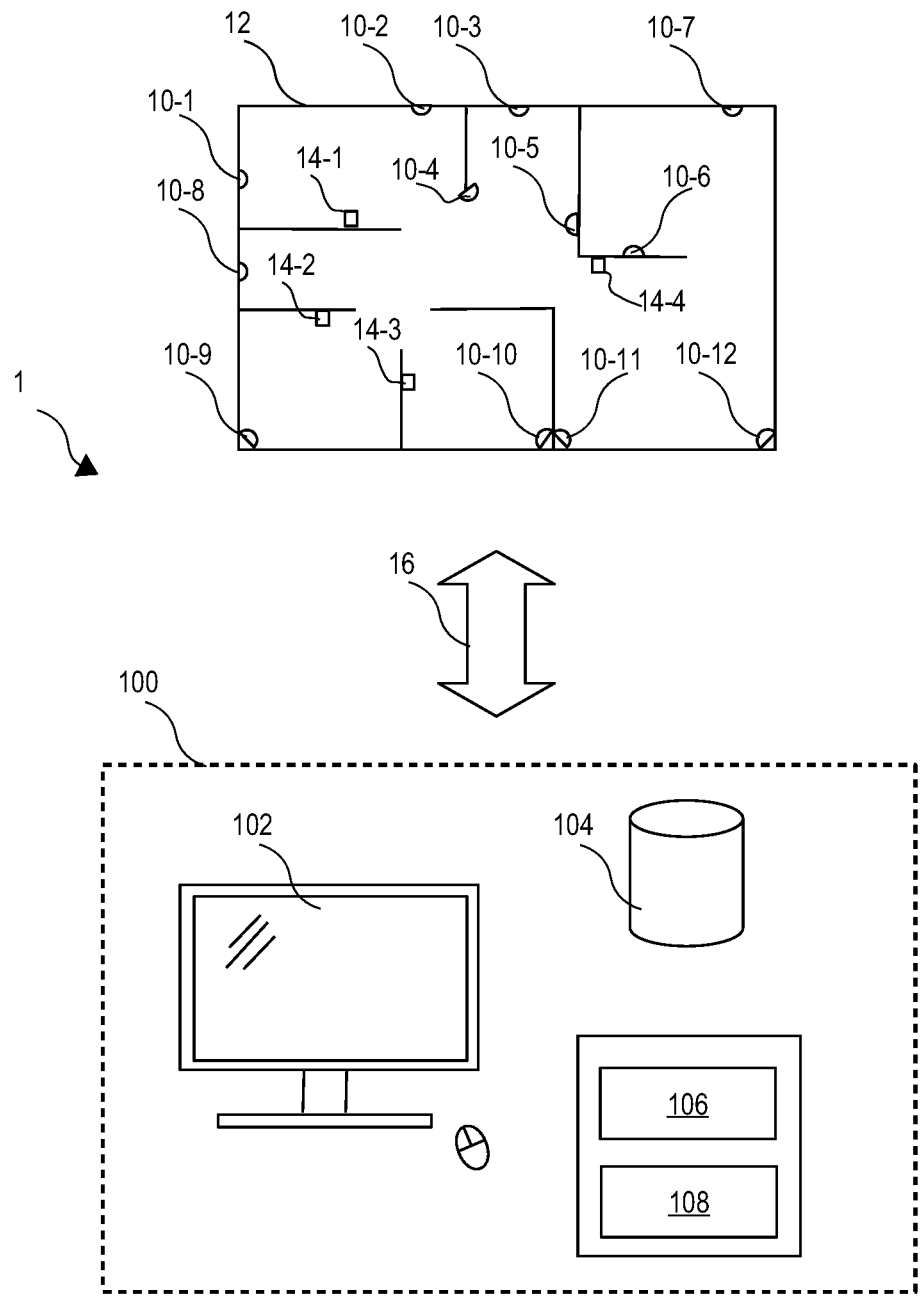
FIG. 1 schematically illustrates a video surveillance system according to embodiments.

FIG. 1 illustrates a video surveillance system 1 comprising a plurality of video cameras 10 being installed to monitor an area 12, and a video management system 100. The video management system 100 will also be referred to herein as a system for composing a video material of a course of actions along a track in the area 12 monitored by the plurality of cameras 10.

The monitored area 12 is illustrated in the form of a map which shows the planning of the area 12. In this example it is assumed that the area 12 is an indoors area where walls separate different portions of the area 12 to form rooms, corridors and other spaces. However, it is understood that the concepts described herein apply equally well to other types of areas, including outdoors areas. A plurality of video cameras 10, here illustrated by twelve cameras enumerated 10-1 through 10-12, are arranged in the monitored area 12. Each of the cameras 10 has a field-of-view which covers a portion of the monitored area. Some of the cameras 10 may be fixed cameras, meaning that they have a fixed field-of-view. Others may have a variable field-of-view, meaning that the cameras can be controlled to move in a pan or tilt direction and/or zoomed such that their field-of-views cover different portions of the area 12 at different points in time. As a special case of cameras with variable field-of-view, there may be cameras which are carried by objects that move around in the area 10, such as mobile phone cameras, body worn cameras, or drone mounted cameras. Preferably, the plurality of cameras 10 are arranged in the monitored area 12 such that each point in the monitored area 12 falls, or may fall, within the field-of-view of at least one of the plurality of cameras 10. However, that is not a necessity for implementing the concepts described herein.

In addition to the video cameras 10, a plurality of data sources 14 may be arranged in the area 12. The data sources 14 may generally generate any type of data that provides evidence of an action or event having occurred in the monitored area 12. This includes sensors and/or detectors, such as microphones, radar sensors, door sensors, temperature sensors, thermal cameras, face detectors, license plate detectors etc. The data sources 14 may also include a point of sales system which registers sales and returns of purchases made in the area 12. A data source 14 may, by configuration, be associated with a camera 10 or another data source. For example, data source 14-1 may be associated with camera 10-1, or data source 14-2 may be associated with data source 14-1. Also, chains of such associations may be formed. By way of example, data source 14-2 may be associated with data source 14-1 which in turn is associated with camera 10-1. Such associations, and chains of associations, may be used when collecting data from a camera or a data source 14. For example, if video is to be collected from a camera during a time period, data may then automatically also be collected from the associated data source during that time period.

The plurality of cameras 10 and the additional data sources 14 (if available) communicates with the video management system 100 over a communication link 16. The communication link 16 may be provided by any type of network, such as any known wired or wireless network. By way of example, the plurality of cameras 10 may send recorded video to the video management system 100 over the communication link 16 for display or storage. Further, the video management system 100 may send control instructions to the plurality of cameras 10 to start and stop recording or to redirect or change the zoom level of one or more of the cameras 10.

The video management system 100 comprises a user interface 102, a data storage 104, and a processor 106. The video management system 100 may also comprise a computer-readable memory 108 of a non-transitory type, such as a non-volatile memory. The computer-readable memory 108 may store computer-code instructions that, when executed by the processor 106, causes the processor 106 to carry out any method described herein.

The user interface 102 may include a graphical user interface via which an operator can watch video recorded by one or more of the plurality of cameras 10. The user interface 102 may also display a map of the monitored area, similar to the map of the area shown at the top of FIG. 1. As will be explained in more detail later on, an operator may interact with the map to indicate positions in map, for instance by clicking with a mouse cursor on a position in the map. If the operator indicates several positions in the map after each other, the indicated positions will define a track in the area 12.

The data storage 104, which may be a database, stores video recordings received from the plurality of cameras over the communication link 16. The data storage 104 may further store one or more tracks which have been defined by an operator by interaction with the user interface 102.

The processor 106, interacts with the user interface 102 and the database 104 to compose a video material of a course of actions along such a track. This will now be explained in more detail with reference to the flow chart of FIG. 2 which shows a first group of embodiments of a method for composing a video material. The dashed lines in FIG. 2 (and in FIGS. 5 and 6) illustrate optional steps.

Figure 2:
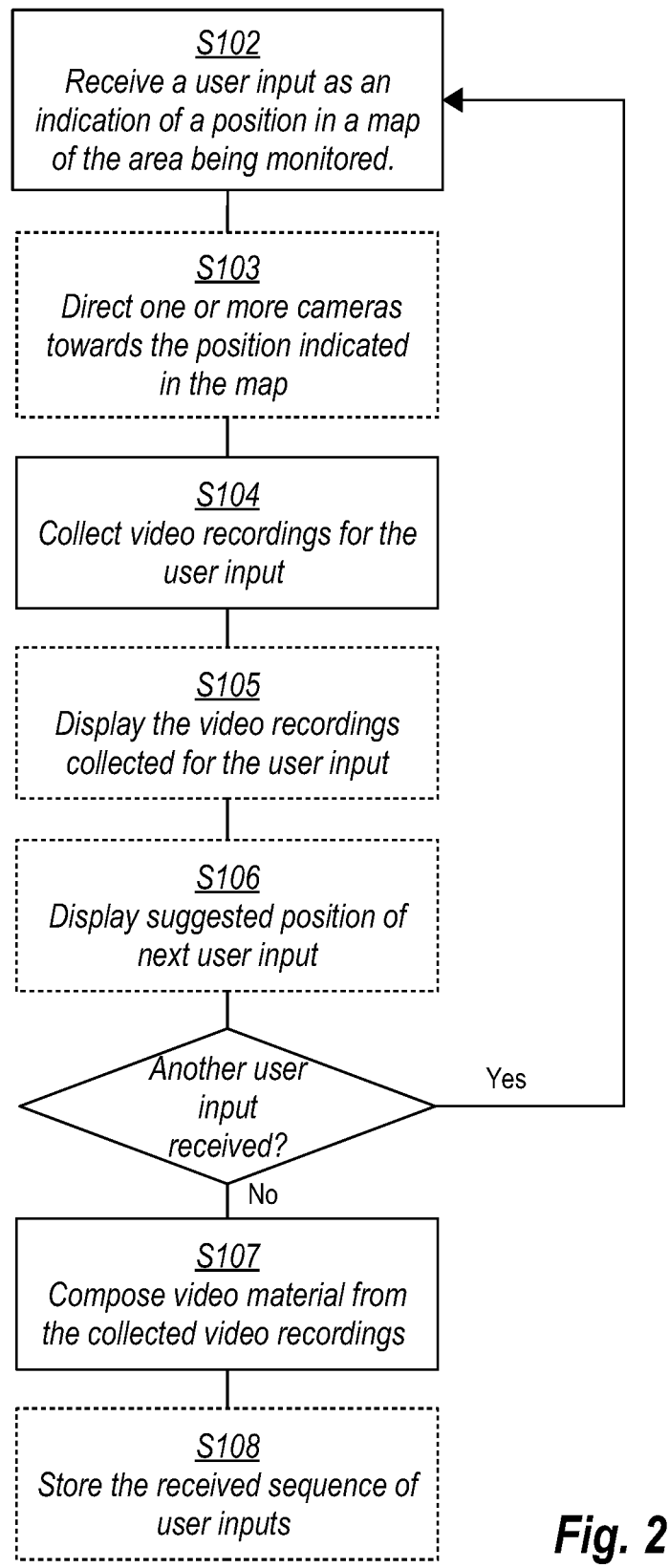
FIG. 2 is a flow chart of a method for composing a video material according to a first group of embodiments.

In the first group of embodiments shown in FIG. 2 it is assumed that an operator provides input regarding a track in the area 12 in real time, that is, meanwhile the video is recorded.

The method starts at step S102 by the receipt of a first user input via the user interface 102. The user input is received in the form of an indication of a position in a map of the monitored area 12. This is illustrated in more detail in FIG. 3A. On the user interface 102, a map 32 of the monitored area 12 may be displayed. Via the user interface 102, a user may input an indication 34-1 of a position in the map 32, for example by clicking with a mouse cursor on a desired position in the map 32. Here the indication 34-1 is graphically represented by a star-shaped icon where the center of the icon represents the indicated position. However, it is understood that this is only one of many possibilities.

Optionally, the user input may also indicate a region around the position. The purpose of the region is to associate the position indication with a degree of uncertainty. The degree of uncertainty reflects how certain the user is of the exact position which is input. In other words, the size of the region indicates the precision of the input. For example, a larger region may indicate a more uncertain or less precise position indication than a smaller region. To specify the region, a user may input a graphical icon, such as the star shown in FIG. 3A or a circle or a rectangle, where the center of the icon indicates the desired position while the size of the icon reflects the degree of uncertainty.

Figure 3A:
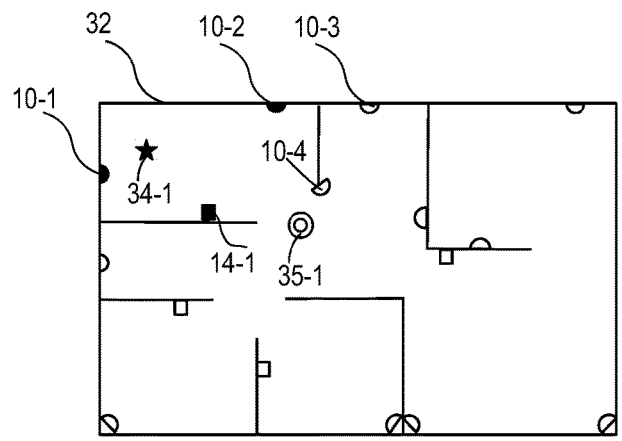
FIGS. 3A-3D schematically illustrates a sequence of user inputs which are received as indications of positions in a map of a monitored area.

Upon reception of the user input, the processor 106 associates the received user input with a time stamp. In the first group of embodiments where the user-inputs are made while the video is being captured, the time stamp corresponds to the time when the user input was made. In the example of FIG. 3A, the first user input identifying position 34-1 is associated with a time stamp T1.

In some cases, specifically when there are video cameras 10 having a variable field-of-view, the processor 106 may in step S103 control one or more of the video cameras 10 to be directed towards the indicated position 34-1. For example, assuming that the video camera 10-2 is a camera with pan-tilt-zoom functionality, the processor 106 may control the video camera 10-2 to be directed towards the indicated position 34-1. It is understood that the processor 106 does not necessarily re-direct all cameras having a variable field-of-view in step S103, but only those cameras having a field-of-view that may cover the position 34-1 when being re-directed or zoomed. If an uncertainty region around the position 34-1 has been provided by the user input, it may be enough if the field-of-view of the camera when re-directed or zoomed overlaps with the identified region. For example, there would be no need for the processor 106 to redirect camera 10-3 towards the position 34-1 since there is a wall in between. The processor 106 may identify candidate cameras to redirect on basis of the positions of the cameras 10 in relation to the indicated position 34-1 and using knowledge of the plan of the area, such as where walls or other obstacles are located.

In step S104, the processor 106 then collects video recordings associated with the user input received in step S102. The video recordings are collected during a time period starting from the time stamp associated with the user input. In order to do so, the processor 106 first identifies those of the plurality of cameras 10 that have a field-of-view covering the position 34-1 indicated by the user input. The processor 106 may identify those cameras by using information regarding where the cameras 10 are installed in the area 12, and information regarding the plan of the area, such as where walls and obstacles are located. Such information is typically provided upon installation of the cameras in the area and may be stored in the data storage 104 of the video management system 100. In the example illustrated in FIG. 3A, the processor 106 identifies cameras 10-1 and camera 10-2 (after re-direction as described above). These cameras are indicated by having a black fill in the figure.

In cases where the user input further defines a region around the position 34-1, the processor 106 may more generally identify video cameras that have a field-of-view that overlaps the region. Thus, when a larger region is indicated by the user input, more cameras may potentially be identified by the processor 106. In cases where a wall in the area 12 divides the region associated with an indicated position into two portions, video cameras 10 being located on the other side of the wall compared to the indicated position may be excluded from being identified.

Further, in cases where additional data sources 14 are present in the area 12, the processor 106 may also identify data sources 14 which are located within a predetermined distance from the indicated position 34-1. The predetermined distance may be different for different types of data sources 14 and may also vary depending on where in the area 12 the data source is located. In the example of FIG. 3A, the processor 106 identifies that the sensor 14-1 is within a predetermined distance from position 34-1.

Figure 4:
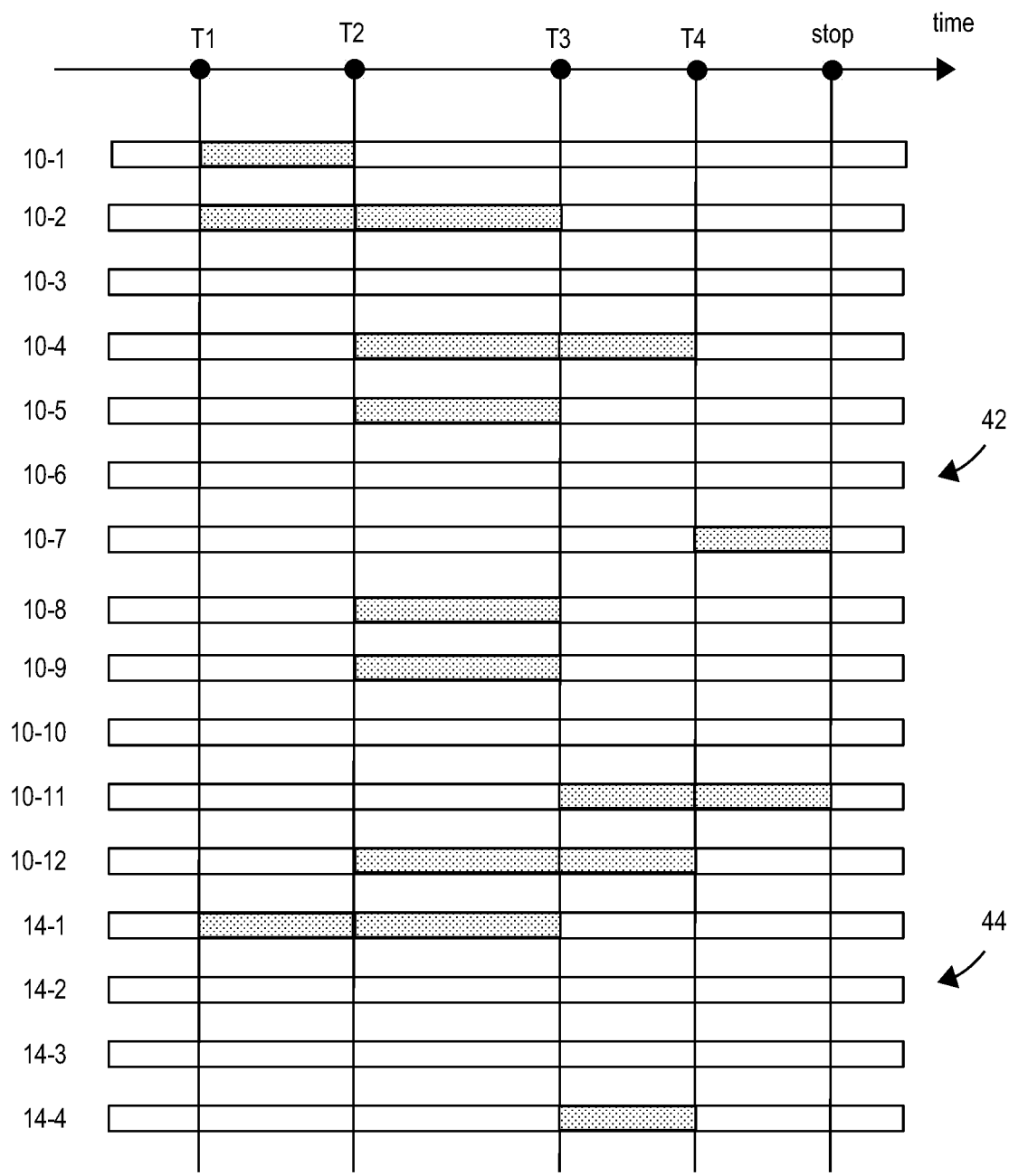
FIG. 4 illustrates video recordings collected for user inputs in the sequence illustrated in FIGS. 3A-3D.

Having identified cameras 12 and possibly also additional data sources 14 as described above, the processor 106 collects video and data from these. This is further illustrated in FIG. 4 showing a time line and video recordings 43 and data 44 generated by the cameras 10-1 through 10-12 and the additional data sources 14-1 through 14-4. Time stamps associated with user inputs are identified along the time line, such as the time stamp T1 associated with the first user input indicating position 34-1 on the map. The processor 106 collects video recordings from the identified cameras, as well as from the data sources if available, starting from time stamp T1 associated with the first user input. Video and data are collected until another user input is received or an indication is received that there will be no more user inputs. Thus, in the illustrated example, video recordings are collected for the cameras 10-1 and 10-2 and the data source 14-1 until a next user input associated with time stamp T2 is received. In FIG. 4, the collected recordings are indicated by the shaded areas.

Optionally, the processor 106 may display the collected video recordings on the user interface 102, step S105. In this way, the user is enabled to follow the current actions at the indicated position 34-1. This also facilitates for the user to make a decision regarding a next user input. For example, the user may see from the video that an object is moving in a certain direction and may then decide to indicate a position on the map in that direction in order to follow the object.

As an option, the processor 106 may also provide one or more suggestions to the user, via the user interface 102, regarding the position for the next user input. The one or more suggestions may be provided in the map 32 by using a predefined graphical symbol. In the example of FIG. 3A, the processor 106 suggest a position 35-1 as a possible position for the next user input. The suggestion guides the user in order to select a next position. The processor 106 may base its suggestion on a number of factors. For example, it may be based on the position 34-1 of the current user input and the positions of the video cameras 10 and/or the additional data sources 14 in the area 12. In that way, the processor 106 may suggest a next position which is covered by one or more of the cameras. The suggestion may further be based on the plan of the area 12. The plan of the area 12 provides useful input regarding possible tracks that an object may take given where walls and other obstacles are located in the area 12. Additionally, or alternatively, the processor 106 may also make use of historical data obtained by tracking objects in the area 12. Based on statistics of historical object tracks in the area 12, the processor 106 may conclude along which tracks objects typically move through the area 12. Given that the current user input 34-1 is along such a track, the processor 106 may suggest a next position along that track. The position suggested along the track may be selected such that at least one of the cameras 10 has a field-of-view covering the suggested position.

The processor 106 then awaits a further user input via the map 32 shown on the user interface 102.

If a further user input is received, the processor 106 repeats steps S102, S104, and optionally also steps S103, S105, S106 for the new user input.

Figure 3B:
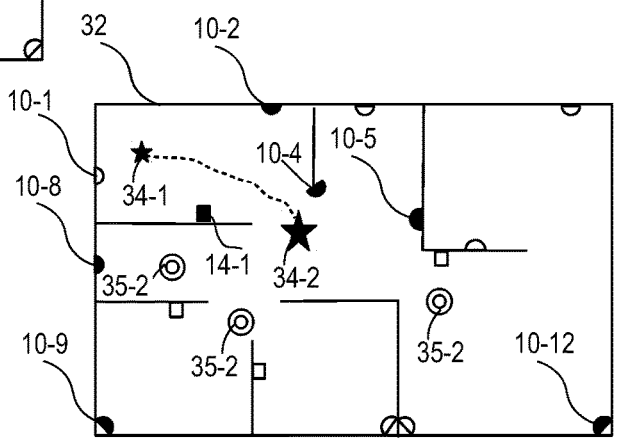

Returning to the example, FIG. 3B illustrates a second user input indicating a position 34-2. The processor 106 associates the second user input with a time stamp T2 corresponding to the point in time when the second user input is received. The second user input may be provided by accepting the suggested position 35-1, for example by clicking on the suggested position 35-1 with a mouse cursor. Alternatively, the user input may be provided by simply indicating a desired position in the map 32. In this case, the user input defines a region around the position 34-2 which is larger than the corresponding region for the position 34-1. This is illustrated by the star-shaped icon for position 34-2 being larger than the star-shaped icon for position 34-1. Hence, the user input reflects that the uncertainty of the indicated position 34-2 is larger than that of the indicated position 34-1.

Responsive to the second user input, the processor 306 may optionally proceed to direct one or more of the cameras 10 towards the position 34-2 as described above in connection to step S103. Further, the processor 106 may identify which of the cameras 10 have a field-of view that covers the indicated position 34-2 or at least overlaps with the region around the indicated position 34-2 as defined by the second user input. In this case cameras 10-2, 10-4, 10-5, 10-8, 10-9, 10-12, are identified. Further, the processor 106 may identify if any of the data sources 14 are within a predetermined distance from the indicated position 34-2. In this case the data source 14-1 is identified. The processor 106 then in step S104 collects video recordings from the identified video cameras, and from the identified data sources, if any. As illustrated in FIG. 4, the collection starts from time stamp T2 and continues until another user input with time stamp T3 is received. Optionally, the collected video recordings may be shown on the user interface 102 to allow the user to follow the course-of-actions at position 34-2 in real time.

Further, as shown in FIG. 3B, the processor 106 suggests a plurality of positions 35-2 as candidates for the next user input.

Figure 3C:
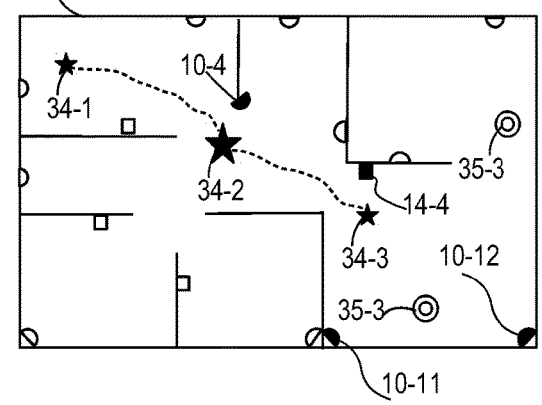
Figure 3D:
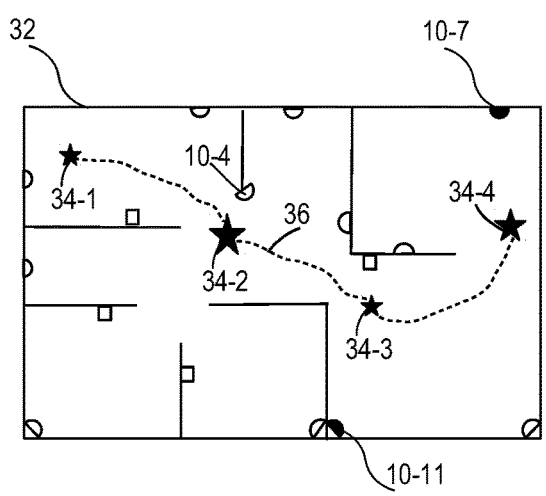

As shown in FIGS. 3C and 3D, the processor 106 repeats the above process for a third user input indicating position 34-3 and a fourth user input indicating position 34-4, respectively. The third user input is associated with time stamp T3, and the fourth user input is associated with time stamp T4. Following the fourth user input, the processor 106 receives via user interface 102 an indication that this was the last user input. For the third user input, and as shown in FIG. 4, video recordings are collected from cameras 10-4, 10-11, 10-12 between time stamps T3 and T4. Further, data from the data source 14-4 is collected. Also, candidate positions 35-3 for the next user input are suggested in the map 32. For the fourth user input, video recordings are collected from cameras 10-4, 10-11, 10-12 between time stamps T4 and the time of receipt of the indication that the fourth user input was the last one, which is the time denoted by "stop" in FIG. 4.

As is best seen in FIG. 3D, the sequence of the received user inputs defines a track 36 in the area 12 monitored by the plurality of cameras 10. Specifically, such a track 36 is defined by the positions 34-1, 34-2, 34-3, 34-4 indicated by these user inputs. Further, the video recordings collected by the processor 106 as described above shows the course of actions in the area 12 along the track 36.

In step S107, the processor 106 then composes a video material from the collected video recordings. Further, the data collected from the data sources 14 may be added to the video material. The video material may be in the form of an export file to which the collected recordings are added. The video material may be exported to, for instance, constitute forensic evidence. The video material may also be stored in the data storage 104 for future use.

The video material may also include the first sequence user inputs defining the track 36 in the monitored area. In particular, the positions 34-1, 34-2, 34-3, 34-4 and the associated time stamps T1, T2, T3, T4 may be included in the video material. The video material may further include a representation of the map 32 of the area 12. This allows the recipient of the video material to not only playback the video included in the video material but also simultaneously display the map in which the track is indicated.

The video material may also include metadata associated with the cameras 10. The metadata may include an indication of the field-of-views of the cameras 10, and possibly also how the field-of-views changes over time. In particular, the field-of-views of the cameras from which video recordings are collected may be included as metadata. Having such metadata in the video material allows the field-of-views of the cameras 10 and how they change over time to be displayed in the map 10. In other words, the metadata may be used to animate the map 10. For portable cameras, such as mobile phone cameras or body worn cameras, the metadata included in the video material may concern the positions of the cameras and how the positions changes over time.

In a similar way, the video material may also include metadata associated with the additional data sources 14. In that case, the metadata may concern how a value of the additional data sources 14 changes over time. The metadata of the data sources 14 may be used to animate the map 10, for example by animating opening and closing of a door in the map 10 depending on the value of a door sensor.

The video material may be provided with a signature which prevents the video material from being edited and makes it possible to detect if the data in the video material has been tampered with. This is advantageous in cases where the video material is to be used as forensic evidence.

In other cases, the video material is editable. In that case, the video material may be provided with an edition history such that the changes made to the video material after it was created easily can be followed.

Optionally, in step S108, the processor 108 may also store the sequence of user inputs. For example, the indicated positions 34-1, 34-2, 34-3, 34-4 may be stored along with their associated time stamps in the data storage 104.

In a second group of embodiments, the input regarding the track in the area 12 is not performed in real time, that is, not meanwhile the video is recorded. More specifically, it is assumed that the video cameras 10 records video during a first time period and that input regarding a track in the area 12 is received after the first time period. In other words, the operator wishes to generate a video material of a course of actions that occurred during the first time period along a track in the area. However, the track is not specified until after the first time period. The second group of embodiments hence allows a user to generate a video material of a course of actions along a certain track from pre-recorded video.

Figure 5:
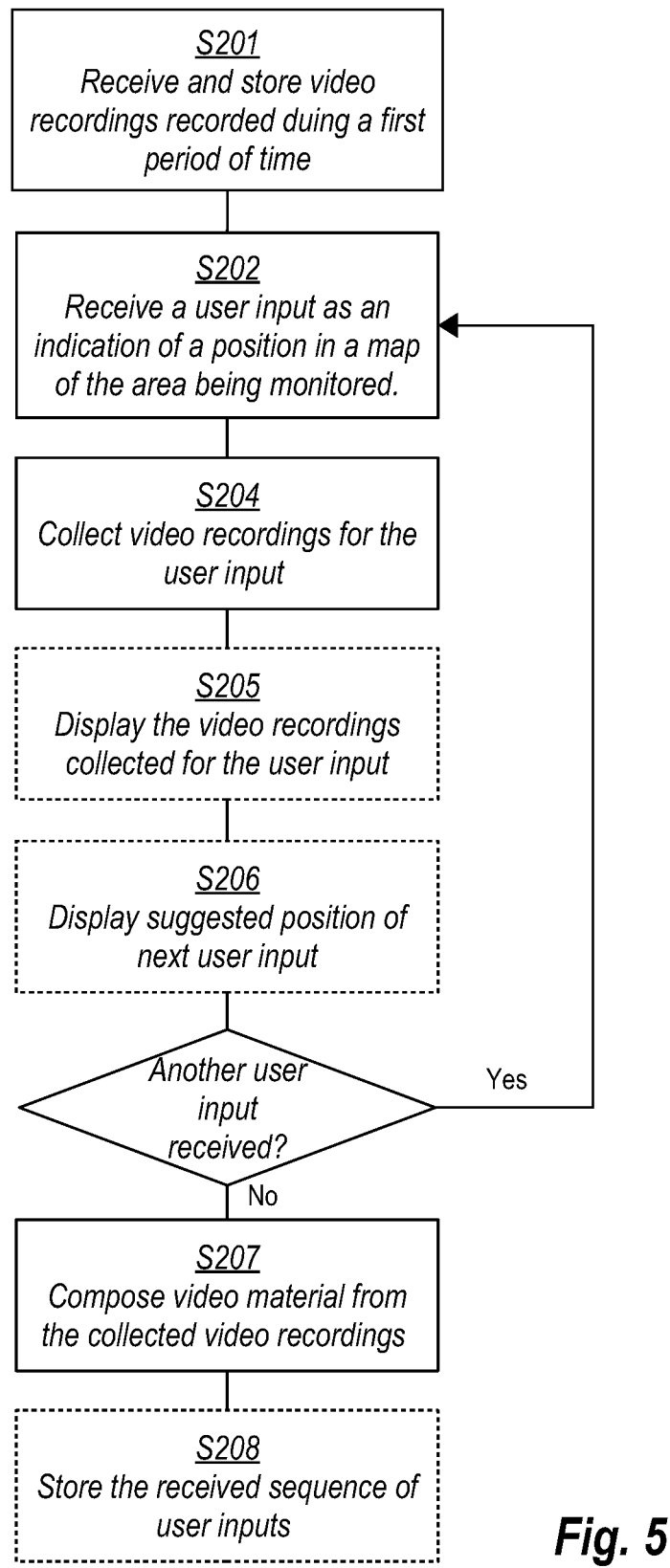
FIG. 5 is a flow chart of a method for composing a video material according to a second group of embodiments.

The second group of embodiments will now be explained in more detail with reference to the flow chart of FIG. 5.

In step S201, the processor 106 receives and stores video recordings captured by the plurality of cameras 10 during a first time period. Such video recordings may be stored by the processor 106 in the data storage 104.

The processor 106 then proceeds to receive user input, step S202, and collect video recordings for the user input, step S204. Optionally, the processor 106 may also display the video recordings collected for the user input, step S205, and display a suggested position of a next user input, step S206. These steps correspond to steps S102, S104, S105, S106 of the first group of embodiments. Notably, however, since the method operates of previously recorded video data it is not possible to carry out step S103 of FIG. 2 of directing cameras. Further, in contrast to the first group of embodiments, steps S202, S204, S205, S206 are carried out after the first period of time during which video was recorded.

In order to follow a course of actions that occurred during the first time period, the track defined by the sequence of user inputs needs to be related to time points during the first time period. Hence, the time stamp associated with a user input should not correspond to the time point when the user input is received. Instead, the processor 106 associates a user input with a time stamp that corresponds to a time point within the first time period. For example, the processor 106 may receive a user input which specifies the time point during the first time period that should be the time stamp of the first user input defining the start of the track. The time stamps of the following user inputs may then be set in relation to the time stamp of the first user input. In practice, this could correspond to a user observing the recorded material, finding an event of interest, and then starting to track the object of interest as if it was a live view. A difference is of course that the user could fast forward through the bulk of material when localizing next suitable user input. Another difference is that the user also could track the objects backwards in time, still the time stamps of relevance will be coupled to the time of recording rather than the time of the user input.

When the processor 106 receives an indication that no more user inputs will be received, it proceeds in step S207 to compose a video material from the collected video recordings. Optionally, it may also store the received sequence of user inputs in the data storage 104. These steps are performed in the same manner as steps S107 and steps S108 described in connection to FIG. 2.

Figure 6:
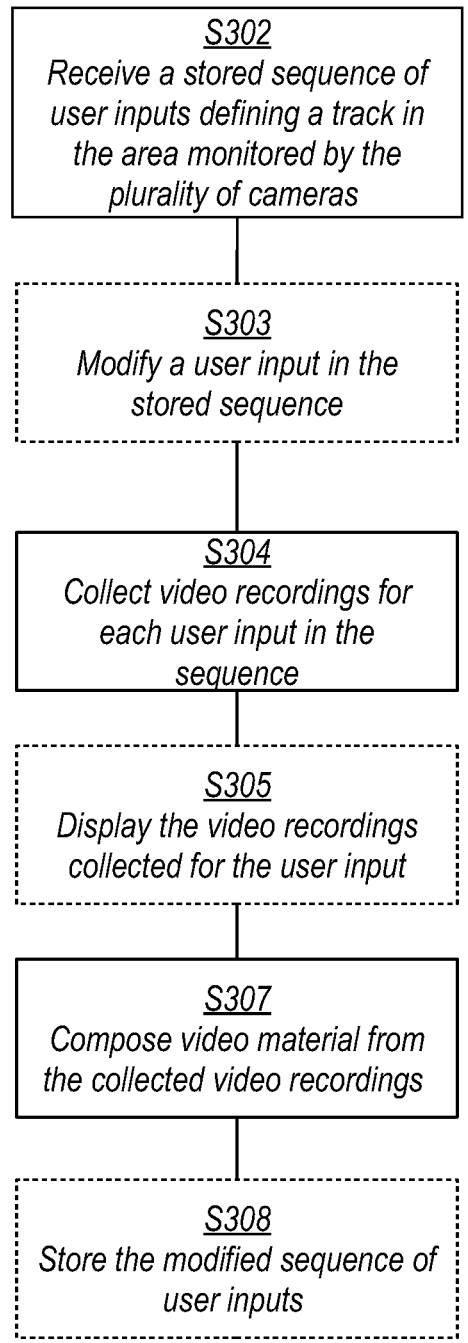
FIG. 6 is a flow chart of a method for composing a video material according to a third group of embodiments.

In a third group of embodiments, illustrated in the flow chart of FIG. 6, the method operates on a stored sequence of user inputs. In more detail, in step S302, the processor 106 receives a stored sequence of user input defining a track in the area monitored by the plurality of cameras 10. For example, the processor 106 may access a stored sequence of user inputs from the data storage 104 as previously stored in step S108 of the first group of embodiments or in step S208 of the second group of embodiments.

Optionally, the processor 106 may in step S303 modify one or more of the user inputs in the received sequence of user inputs. The modification may be made responsive to a user input. For example, the processor 106 may show the received sequence of user inputs on the display 102 together with the map 32 of the monitored area. A user may then adjust one of the indicated positions, for example by moving the graphical representation of the position using a mouse cursor.

The processor 106 may then proceed to collect video recordings for each user input in the sequence, step S304, and compose a video material from the collected video recordings, step S307. Optionally, the processor 106 may also display the video recordings collected for the user input, step S305, and store the possibly modified sequence of user inputs, step S308. Steps S304, S305, S307, and S308 are performed in the same way as the corresponding steps of the first and the second group of embodiments and are therefore not described in more detail.

Figure 7:
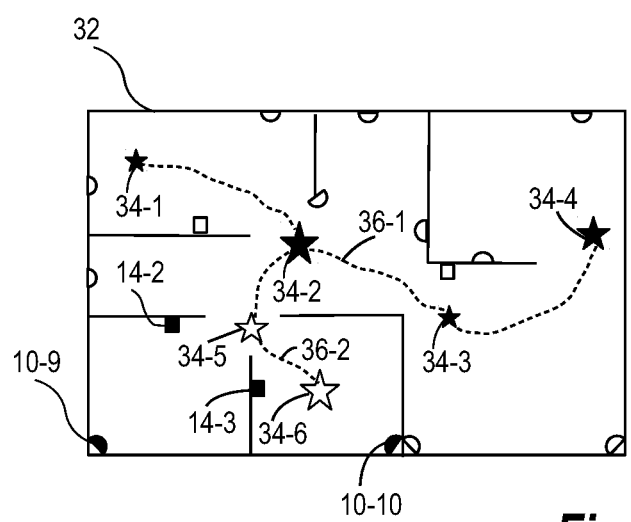
FIG. 7 schematically illustrates two overlapping sequences of user inputs.

Embodiments described herein may advantageously be used for composing a video material of an object that moves through the monitored area, such as a person walking through the area. In some situations, it may happen that the tracks of two objects overlap, meaning that they share at least one position indicated by a user input. For example, two objects may first move together along a common track and then separate such that the track splits into two sub-tracks. This is illustrated in FIG. 7 where a first track 36-1 is defined by positions 34-1, 34-2, 34-3, 34-4 and a second, overlapping, track 36-2 is defined by positions 34-1, 34-2, 34-5, 34-6. Alternatively, two objects may first move along two separate tracks and then join each other to move along a common track. In such situations it may be of interest to compose a common video material for the overlapping tracks. This may be achieved by receiving a second sequence of user inputs defining the second track 36-2 in addition to the first sequence of user inputs defining the first track 36-1. Then, the processor 106 may identify user inputs of the second track 36-2 which are non-overlapping with user inputs of the first track 36-1. In the example of FIG. 7, the processor 106 would then identify user inputs corresponding to positions 34-5 and 34-6. The processor 106 may then proceed in the same manner as explained in connections to step S104, S204, and S304 to collect video recordings from those of the plurality of cameras 10 that have a field-of-view covering the positions of the identified user inputs of the second track 36-2. In the example of FIG. 7, the processor 106 may collect video recordings from video camera 10-9 for the user input indicating the position 34-5. The video may be collected between a time stamp associated with user input 34-5 and a time stamp associated with the next user input 34-6. Additionally, data may be collected from the data source 14-2 being within a predetermined distance from the indicated position 34-5. For the user input indicating the position 34-6, the processor 106 may collect video recordings from the video camera 10-10 starting from the time stamp associated with user input 34-6 and ending when an indication to stop the collecting is received. Further, data may be collected from the data source 14-3 which is within a predetermined distance from the indicated position 34-6.

It will be appreciated that a person skilled in the art can modify the above-described embodiments in many ways and still use the advantages of as shown in the embodiments above. Thus, the teachings should not be limited to the shown embodiments but should only be defined by the appended claims. Additionally, as the skilled person understands, the shown embodiments may be combined.

The invention claimed is:

1. A method for composing a video material of a course of actions along a track in an area monitored by a plurality of video cameras, comprising:
   receiving a first sequence of user inputs defining a track in the area monitored by the plurality of video cameras, wherein each user input in the first sequence of user inputs is received as an indication of a position on a map of the area being monitored by the plurality of video cameras, wherein each user input in the first sequence defining the track corresponds to a different position on the map and is associated with a time stamp,
   for each user input in the first sequence, collecting video recordings from those of the plurality of video cameras that have a field-of-view covering the position indicated by the user input, the collected video recordings being recorded in a time period starting at the time stamp associated with the user input and ending at a time stamp associated with a next user input in the first sequence or when an indication to stop the collecting is received, and
   composing a video material from the video recordings collected for each user input in the first sequence such that the video material includes the video recordings along the track defined by the first sequence of user inputs.

2. The method of claim 1, wherein at least one of the user inputs further indicates a region around the position in the map of the area being monitored, the size of the region reflecting a degree of uncertainty of the indicated position, and
   wherein, when collecting video recordings for the at least one user input, video recordings are collected from those of the plurality of video cameras that have a field-of-view overlapping the region around the position indicated by the user input.

3. The method of claim 1, further comprising:
   in response to receiving a user input in the first sequence of user inputs, directing one or more of the plurality of video cameras towards the position indicated in the map of the area being monitored.

4. The method of claim 1, further comprising:
   in response to receiving a user input in the first sequence of user inputs, displaying video recordings from those of the plurality of video cameras that have a field-of-view covering the position indicated by the user input, the video recordings starting from the time stamp associated with the user input.

5. The method of claim 1, further comprising:
   in response to receiving a user input in the first sequence of user inputs, displaying one or more suggestions for a position of a next user input in the map of the area being monitored.

6. The method of claim 5, wherein the one or more suggestions for a position of a next user input are determined on basis of the position indicated by the latest received user input in the first sequence of user inputs and the positions of the plurality of video cameras in the area being monitored.

7. The method of claim 1, further comprising:
   storing the first sequence of user inputs, and
   accessing the stored first sequence of user inputs at a later point in time to perform the steps of collecting video recordings and composing the video material.

8. The method of claim 7, further comprising:
   modifying a user input in the stored first sequence of user inputs prior to performing the steps of collecting video recordings and composing the video material.

9. The method of claim 8, wherein a user input in the stored first sequence of user inputs is modified by adjusting the position indicated by the user input in the map of the area being monitored.

10. The method of claim 1, wherein the time stamp associated with a user input corresponds to a point in time when the user input was made.

11. The method of claim 1 further comprising:
receiving and storing video recordings recorded by the plurality of video cameras during a first time period,
wherein the step of receiving a first sequence of user inputs is performed after said first time period, and wherein each user input is associated with a time stamp corresponding to a time within said first time period.

12. The method of claim 1, further comprising:
for each user input in the first sequence, collecting data from other data sources that are arranged within a predetermined distance from the position indicated by the user input, the collected data from the other data sources being generated in a time period starting at the time stamp associated with the user input and ending at a time stamp associated with a next user input in the first sequence or when an indication to stop the collecting is received, and
adding the data from the other data sources to the video material.

13. The method of claim 1, further comprising:
receiving a second sequence of user inputs defining a second track in the area monitored by the plurality of video cameras,
wherein the first and the second sequence of user inputs are overlapping in that they share at least one user input,
for each user input in the second sequence that is not shared with the first sequence of user inputs, collecting video recordings from those of the plurality of video cameras that have a field-of-view covering a position indicated by the user input, the collected video recordings being recorded in a time period starting at a time stamp associated with the user input and ending at a time stamp associated with a next user input in the second sequence or when an indication to stop the collecting is received, and
including in the video material the video recordings collected for each user input in the second sequence of user inputs that is not shared with the first sequence of user inputs.

14. A system for composing a video material of a course of actions along a track in an area monitored by a plurality of video cameras, comprising:
a user interface arranged to receive a first sequence of user inputs defining a track in the area monitored by the plurality of video cameras, wherein each user input in the first sequence of user inputs is received as an indication of a position on a map of the area being monitored by the plurality of video cameras, wherein each user input in the first sequence defining the track corresponds to a different position on the map and is associated with a time stamp,
a data storage arranged to store video recordings from the plurality of video cameras, and
a processor arranged to:
receive the first sequence of user inputs from the user interface,
for each user input in the first sequence, collect from the data storage video recordings from those of the plurality of video cameras that have a field-of-view covering the position indicated by the user input, the collected video recordings being recorded in a time period starting at the time stamp associated with the user input and ending at a time stamp associated with a next user input in the first sequence or when an indication to stop the collecting is received, and
compose a video material from the video recordings collected for each user input in the first sequence such that the video material includes the video recordings along the track defined by the first sequence of user inputs.

15. A non-transitory computer-readable medium on which there are stored computer code instructions that, when executed by a processor, causes the processor to execute a method for composing a video material of a course of actions along a track in an area monitored by a plurality of video cameras, comprising:
receiving a first sequence of user inputs defining a track in the area monitored by the plurality of video cameras, wherein each user input in the first sequence of user inputs is received as an indication of a position on a map of the area being monitored by the plurality of video cameras, wherein each user input in the first sequence defining the track corresponds to a different position on the map and is associated with a time stamp,
for each user input in the first sequence, collecting video recordings from those of the plurality of video cameras that have a field-of-view covering the position indicated by the user input, the collected video recordings being recorded in a time period starting at the time stamp associated with the user input and ending at a time stamp associated with a next user input in the first sequence or when an indication to stop the collecting is received, and
composing a video material from the video recordings collected for each user input in the first sequence such that the video material includes the video recordings along the track defined by the first sequence of user inputs.

* * * * *